US006950474B1

(12) United States Patent
Sudo

(10) Patent No.: US 6,950,474 B1
(45) Date of Patent: Sep. 27, 2005

(54) OFDM COMMUNICATION DEVICE

(75) Inventor: Hiroaki Sudo, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 893 days.

(21) Appl. No.: 09/806,313

(22) PCT Filed: Jul. 26, 2000

(86) PCT No.: PCT/JP00/04969

§ 371 (c)(1),
(2), (4) Date: Mar. 29, 2001

(87) PCT Pub. No.: WO01/15365

PCT Pub. Date: Mar. 1, 2001

(30) Foreign Application Priority Data

Aug. 20, 1999 (JP) ................................ 11-233909

(51) Int. Cl.[7] ................................................ H04K 1/10
(52) U.S. Cl. ....................................... 375/260; 375/267
(58) Field of Search ................................ 375/372, 295, 375/298, 300, 302, 259, 265, 267, 260, 316; 370/331, 310, 335, 210, 208, 209, 482, 483, 370/514; 714/100, 746

(56) References Cited

U.S. PATENT DOCUMENTS 5,636,242 A * 6/1997 Tsujimoto ................... 375/130
5,812,601 A * 9/1998 Schramm .................... 375/262
6,304,609 B1 * 10/2001 Stephens et al. ............ 375/259
6,345,377 B1 * 2/2002 Kroeger et al. ............. 714/790
6,370,666 B1 * 4/2002 Lou et al. ................... 714/751
6,442,176 B1 * 8/2002 Yahagi ....................... 370/474
6,507,629 B1 * 1/2003 Hatakeyama ............... 375/372
6,563,807 B1 * 5/2003 Kim et al. .................. 370/331
6,678,856 B1 * 1/2004 Jordan et al. ............... 714/755
6,707,806 B1 * 3/2004 Kato .......................... 370/336
6,747,948 B1 * 6/2004 Sarraf et al. ................ 370/210
6,757,322 B2 * 6/2004 Schilling .................... 375/141

FOREIGN PATENT DOCUMENTS

JP 11215091 8/1999
JP 11215092 8/1999

OTHER PUBLICATIONS

Mizoguchi Masato et al., "An Experimental Study on an OFDM Modem for 5 GHz Band High Data Rate Wireless LAN Systems." Techincal Report of IEICE, SSE99, RC599-74, Jul. 1999. pp. 67-72.

* cited by examiner

*Primary Examiner*—Emmanuel Bayard
(74) *Attorney, Agent, or Firm*—Stevens, Davis, Miller & Mosher, LLP

(57) ABSTRACT

The OFDM communication apparatus according to the present invention includes a plurality of interleave sections capable of executing mutually different interleave processing on a transmission signal, a selection section for selecting the interleave section to execute interleave processing on the transmission signal from among the plurality of interleave sections and an OFDM section for performing OFDM processing on the transmission signal interleaved by the selected interleave section.

12 Claims, 4 Drawing Sheets

OFDM COMMUNICATION DEVICE

TECHNICAL FIELD

The present invention relates to an OFDM (Orthogonal Frequency Division Multiplexing)-based communication apparatus carrying out retransmission control, and more particularly, to an OFDM-based communication apparatus using an interleave technology.

BACKGROUND ART

Retransmission control by a conventional OFDM communication apparatus using an interleave technology will be explained with reference to FIG. 1. FIG. 1 is a block diagram showing a conventional OFDM communication apparatus using an interleave technology. Retransmission control by the conventional OFDM communication apparatus using an interleave technology will be explained below, taking the following case where a first communication apparatus and a second communication apparatus both equipped with the OFDM communication apparatus shown in FIG. 1 perform a radio communication as an example. What will be explained here is a case where the first communication apparatus sends a signal to the second communication apparatus and when the signal received by the second communication apparatus contains an error, the first communication apparatus retransmits (resends) this erroneous signal to the second communication apparatus.

First, in the transmission system of the first communication apparatus, a transmission signal is stored in retransmission control section 11. This transmission signal is a packet-unit signal. The stored transmission signal is sent by retransmission control section 11 to interleave processing section 12 according to a transmission timing.

In interleave processing section 12, the sequence of the signal sent by retransmission control section 11 is rearranged according to a specific rule. The signal with the rearranged sequence is subjected to predetermined transmission OFDM processing by transmission OFDM section 13 and placed in each subcarrier.

Here, the signal subjected to the predetermined transmission OFDM processing above refers to a signal assigned to each subcarrier at predetermined subcarrier intervals as a result of interleave processing by interleave processing section 12. That is, regarding the signal subjected to the predetermined transmission OFDM processing above, the first to third transmission signals input to interleave processing section 12 are placed at intervals of, for example, 4 subcarriers such as subcarrier 1, subcarrier 5 and subcarrier 9, and so on.

The signal subjected to the transmission OFDM processing is sent to the second communication apparatus via antenna 14. The signal sent from the first communication apparatus is received by the second communication apparatus through a transmission path.

The signal received through antenna 14 by the second communication apparatus is subjected to predetermined reception OFDM processing by reception OFDM section 15. The signal subjected to the predetermined reception OFDM processing above is subjected to deinterleave processing by deinterleave processing section 16. The signal subjected to deinterleave processing is subjected to error correction processing by error correction section 17. The error-corrected signal is output to retransmission control section 11.

When the error-corrected signal in retransmission control section 11 contains no error, this signal is output as a reception signal. On the contrary, when the error-corrected signal contains some error, this signal is stored in predetermined memory. Then, a signal including a packet requesting retransmission of this signal is processed by interleave processing section 12 and transmission OFDM section 13 and then sent to the first communication apparatus through antenna 14.

Then, in the first communication apparatus, retransmission control section 11 sends the packet requesting retransmission by the second communication apparatus to interleave processing section 12 according to a retransmission timing. This packet is subjected to the same processing as that described above and resent to the second communication apparatus through antenna 14.

As shown above, the signal containing an error detected by the second communication apparatus is resent by the first communication apparatus.

However, the conventional OFDM communication apparatus using an interleave technology has the following problems. That is, there are cases where signals of poor quality concentrated on a specific time period are input as the signals subjected to error correction processing in the second communication apparatus.

Here, FIG. 2 is used as a reference to explain this situation more specifically. FIG. 2 is a schematic diagram showing an example of placement of subcarriers of a signal received by the conventional OFDM communication apparatus using an interleave technology. Suppose interleave processing section 12 in the first communication apparatus performs the interleave processing as shown in the example above.

When the signal with subcarriers placed as shown in FIG. 2 is received by the second communication apparatus, the signals output from deinterleave processing section 16 are signals picked up in time series from each subcarrier at intervals of 4 subcarriers such as subcarrier 1, subcarrier 5, subcarrier 9 and subcarrier 13, . . . . Here, as is apparent from FIG. 2, signals placed in subcarrier 1, subcarrier 5, subcarrier 9 and subcarrier 13, . . . are of poor quality.

As a result, signals input to error correction section 17 are signals of poor quality concentrated on a specific time period, which causes the effect of error correction by error correction section 17 to reduce, making signals with errors often output to retransmission control section 11. This causes the first communication apparatus to resend the same packet.

Furthermore, when a variation of the channel (transmission path) state occurs slower than the time interval at which the first communication apparatus sends the same packet, the channel state when the same packet above is sent for the first time becomes virtually the same as the channel state when the above same packet is retransmitted (resent).

In this case, when the signal including the resent packet is received by the second communication apparatus, the state of subcarrier placement in this received signal has virtually the same state as that shown in FIG. 2. Therefore, there is an extremely high probability that the packet resent from the first communication apparatus will also have errors in the second communication apparatus, and furthermore errors will occur consecutively in the above packets. This means that it will take a long time for the second communication apparatus to receive a specific packet sent by the first communication apparatus without errors.

DISCLOSURE OF INVENTION

The inventor of the present invention has come up with the present invention noticing that subcarriers to which transmission signals subjected to OFDM transmission processing are assigned change depending on the interleave processing carried out before OFDM transmission processing, and therefore changing the interleave processing on the transmission signal will change the quality of each signal extracted through OFDM reception processing on the receiving side.

It is an object of the present invention to provide an OFDM communication apparatus capable of reducing the probability that errors will occur consecutively in a same packet. This object is attained by performing interleave processing on the transmission signal according to the number of retransmissions of the transmission signal.

BEST MODE FOR CARRYING OUT THE INVENTION

With reference now to the attached drawings, a best mode for carrying out the present invention will be explained in detail below.

EMBODIMENT

Figure 4:
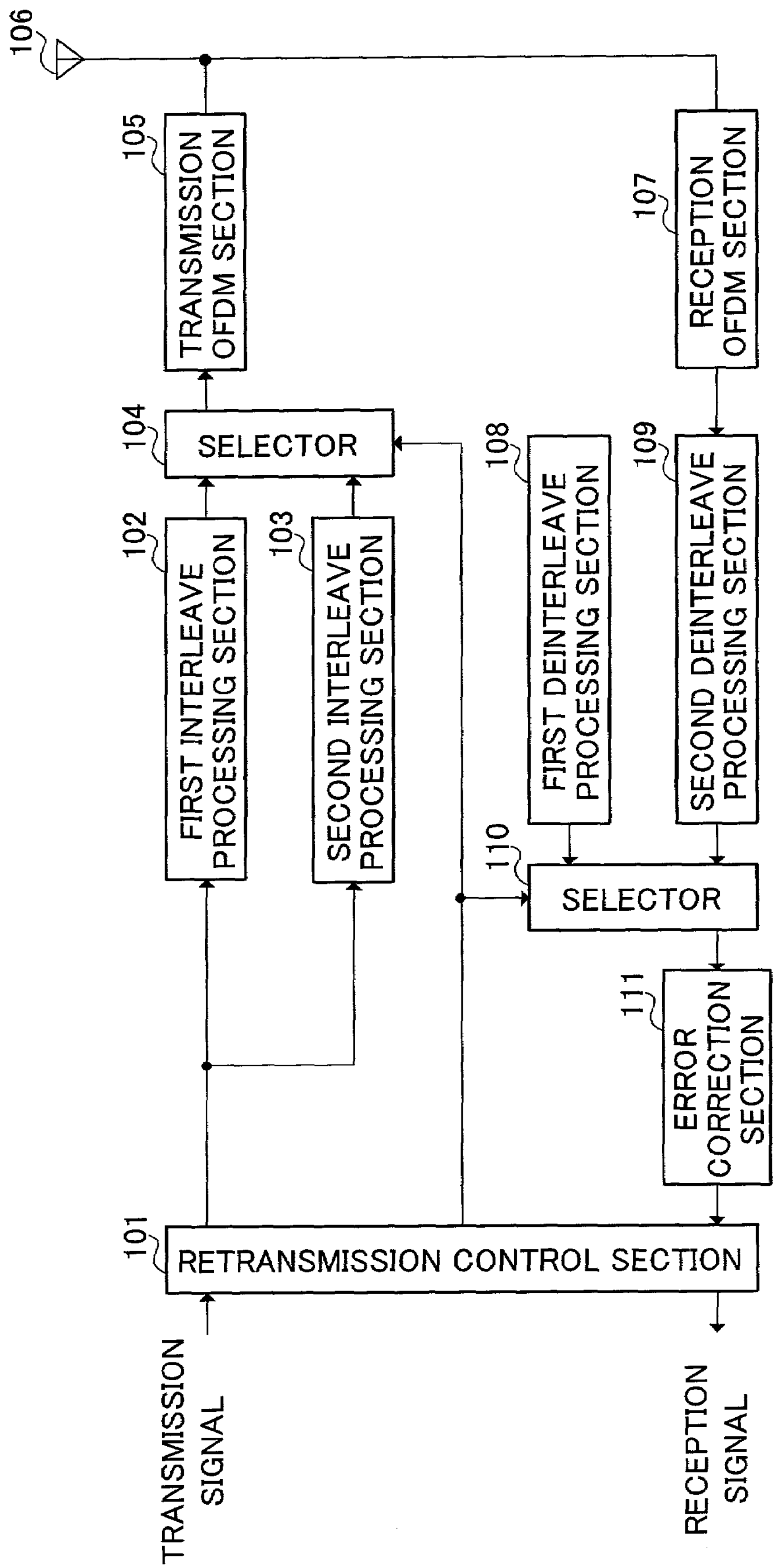
FIG. 4 is a block diagram showing a configuration of an OFDM communication apparatus according to an embodiment of the present invention.

FIG. 4 is a block diagram showing a configuration of an OFDM communication apparatus according to an embodiment of the present invention. Hereinafter, the OFDM communication apparatus according to this embodiment will be explained by taking a case where a first communication apparatus and second communication apparatus both equipped with this OFDM communication apparatus carry out a radio communication as an example. What will be explained here is a case where the first communication apparatus sends a signal to the second communication apparatus and when the signal that the second communication apparatus has received contains some error, the first communication apparatus retransmits (resends) this signal with an error to the second communication apparatus.

First, in the transmission system of the first communication apparatus, a transmission signal is stored in retransmission control section 101. This transmission signal is a packet-unit signal, for example. The stored transmission signal is sent by retransmission control section 101 to first interleave processing section 102 and second interleave processing section 103 according to a preset transmission timing.

First interleave processing section 102 performs interleave processing on the signal sent by retransmission control section 101. That is, the sequence of the signal sent by retransmission control section 101 is rearranged according to a specific rule. The signal with the rearranged sequence is output to selector 104.

Second interleave processing section 103 performs interleave processing on the signal sent by retransmission control section 101. That is, the sequence of the signal sent by retransmission control section 101 is rearranged according to a specific rule. However, the specific rule used by second interleave processing section 103 is different from the specific rule used by first interleave processing section 102. The signal with the sequence rearranged by second interleave processing section 103 is output to selector 104.

As the interleave method by first interleave processing section 102 and second interleave processing section 103, various kinds of interleave including chip interleave and symbol interleave can be used.

Under the control by retransmission control section 101, selector 104 outputs the interleaved signal output from either first interleave processing section 102 or second interleave processing section 103 to transmission OFDM section 105.

More specifically, a control signal is output from retransmission control section 101 to selector 104, which indicates which of the interleaved signal, from first interleave processing section 102 or from second interleave processing section 103, should be output to transmission OFDM section 105 depending on whether the packet sent by retransmission control section 101 is a signal which will be transmitted for the first time or a signal which will be retransmitted.

In this embodiment, it is assumed that when the packet sent by retransmission control section 101 is a signal which will be transmitted for the first time, selector 104 outputs the interleaved signal from first interleave processing section 102 to transmission OFDM section 105 and when the packet sent by retransmission control section 101 is a signal which will be retransmitted, selector 104 outputs the interleaved signal from second interleave processing section 103.

The signal from selector 104, that is, the signal interleaved by first interleave processing section 102 is subjected to predetermined transmission OFDM processing and assigned to subcarriers by transmission OFDM section 105. This transmission OFDM processing includes processing such as serial/parallel conversion, primary modulation (QPSK and 16QAM, etc.) and IFFT (Inverse Fourier Transform).

Here, the signal subjected to the predetermined transmission OFDM processing above refers to a signal assigned to each subcarrier at predetermined subcarrier intervals as a result of interleave processing by first interleave processing section 102. That is, regarding the signal subjected to the predetermined transmission OFDM processing above, the first to fourth transmission signals input to first interleave processing section 102 are placed at intervals of, for example, 4 subcarriers such as subcarrier 1, subcarrier 5 and subcarrier 9, and so on.

The signal subjected to the transmission OFDM processing is transmitted to the second communication apparatus via antenna 106. The signal sent from the first communication apparatus is received by the second communication apparatus through a transmission path.

The signal received through antenna 106 in the second communication apparatus is subjected to predetermined reception OFDM processing by reception OFDM section 107. This reception OFDM processing includes synchronization, FFT (Fourier Transform), transmission diversity, coherent detection (or delay detection) and parallel/serial conversion, etc. The signal subjected to the predetermined reception OFDM processing above is output to first deinterleave processing section 108 and second deinterleave processing section 109.

First deinterleave processing section 108 rearranges the sequence of the signal from reception OFDM section 107 according to a specific rule. This specific rule corresponds to the specific rule used by first interleave processing section 102 in the first communication apparatus. Through this rearrangement, the sequence of the signal from reception OFDM section 107 is rearranged to match the sequence when this signal is sent by retransmission control section 101 in the first communication apparatus. The signal deinterleaved by first deinterleave processing section 108 is output to selector 110.

Second deinterleave processing section 109 rearranges the sequence of the signal from reception OFDM section 107 according to a specific rule. This specific rule corresponds to the specific rule used by second interleave processing section 103 in the first communication apparatus. Through this rearrangement, the sequence of the signal from reception OFDM section 107 is rearranged to match the sequence when this signal is sent by retransmission control section 101 in the first communication apparatus. The signal deinterleaved by second deinterleave processing section 109 is output to selector 110.

Under the control by retransmission control section 101, selector 110 outputs the deinterleaved signal output from either first deinterleave processing section 108 or second deinterleave processing section 109 to error correction section 111.

More specifically, a control signal is output from retransmission control section 101 to selector 110, which indicates which of the deinterleaved signal, from first deinterleave processing section 108 or from second deinterleave processing section 109, should be output to error correction section 111 depending on what times the packet was received through antenna 106, that is, depending on whether the packet received through antenna 106 is a signal which was transmitted for the first time or a signal which was retransmitted by the first communication apparatus.

In this embodiment, it is assumed that when the packet received through antenna 106 is a signal which was transmitted by the first communication apparatus for the first time, selector 110 outputs the deinterleaved signal from first deinterleave processing section 108 to error correction section 111 and when the packet received through antenna 106 is a signal which was retransmitted by the first communication apparatus, selector 110 outputs the deinterleaved signal from second deinterleave processing section 109.

The signal from selector 110, that is, the signal deinterleaved by first deinterleave processing section 108 is subjected to error correction processing by error correction section 111 and output as a packet-unit signal to retransmission control section 101.

When the error-corrected packet-unit signal contains no error, retransmission control section 101 outputs this signal as a reception signal. On the contrary, when the error-corrected packet-unit signal contains some error, this packet-unit signal is stored in predetermined memory. Hereafter, a signal including a packet requesting retransmission of this packet-unit signal is processed by each section of the transmission system and then transmitted to the first communication apparatus through antenna 106.

Hereafter, in the first communication apparatus that has received the signal including the packet requesting retransmission above, retransmission control section 101 sends the packet-unit signal whose retransmission is requested by the second communication apparatus to first interleave processing section 102 and second interleave processing section 103 according to a retransmission timing. Furthermore, retransmission control section 101 outputs to selector 104 a control signal requesting that the interleaved signal from second interleave processing section 103 be output to transmission OFDM section 105.

According to the above control signal, selector 104 outputs the interleaved signal from second interleave processing section 103 to transmission OFDM section 105. That is, the packet-unit signal to be retransmitted is subjected to interleave processing different from the interleave processing when the signal is sent for the first time and output to transmission OFDM section 105. The signal from selector 104 is subjected to the aforementioned processing by transmission OFDM section 105 and transmitted to the second communication apparatus through antenna 106.

Here, the signal subjected to the transmission OFDM processing of the packet to be retransmitted refers to a signal assigned to each subcarrier at predetermined subcarrier intervals different from the ones in the first transmission as a result of interleave processing by second interleave processing section 103. That is, regarding the signal subjected to the transmission OFDM processing above, the first to fourth signals input to second interleave processing section 103 are placed at intervals of, for example, 2 subcarriers such as subcarrier 1, subcarrier 3 and subcarrier 5, and subcarrier 7, and so on. Because of this, each signal in the packet to be retransmitted is assigned to a subcarrier different from the one in the first transmission.

The second communication apparatus receives the signal including the retransmitted packet through antenna 106. The signal received through antenna 106 is subjected to the same processing as that described above by each of reception OFDM section 107, first deinterleave processing section 108 and second deinterleave processing section 109.

Retransmission control section 101 outputs to selector 110 a control signal requesting that the signal subjected to deinterleave processing from second deinterleave section 109 be output to error correction section 111.

According to the above control signal, selector 110 outputs the signal subjected to deinterleave processing from second deinterleave processing section 109 to error correction section 111. That is, the retransmitted packet-unit signal is subjected to deinterleave processing different from the deinterleave processing when the signal is sent for the first time and output to error correction section 111. The signal from selector 110 is subjected to error correction processing by error correction section 111 and output to retransmission control section 101.

Here, when interleaving processing differing between the first transmission and retransmission is applied to a specific packet in the first communication apparatus, how the signal including this retransmitted packet is received by the second communication apparatus will be explained with reference to FIG. 2 again.

Figure 1:
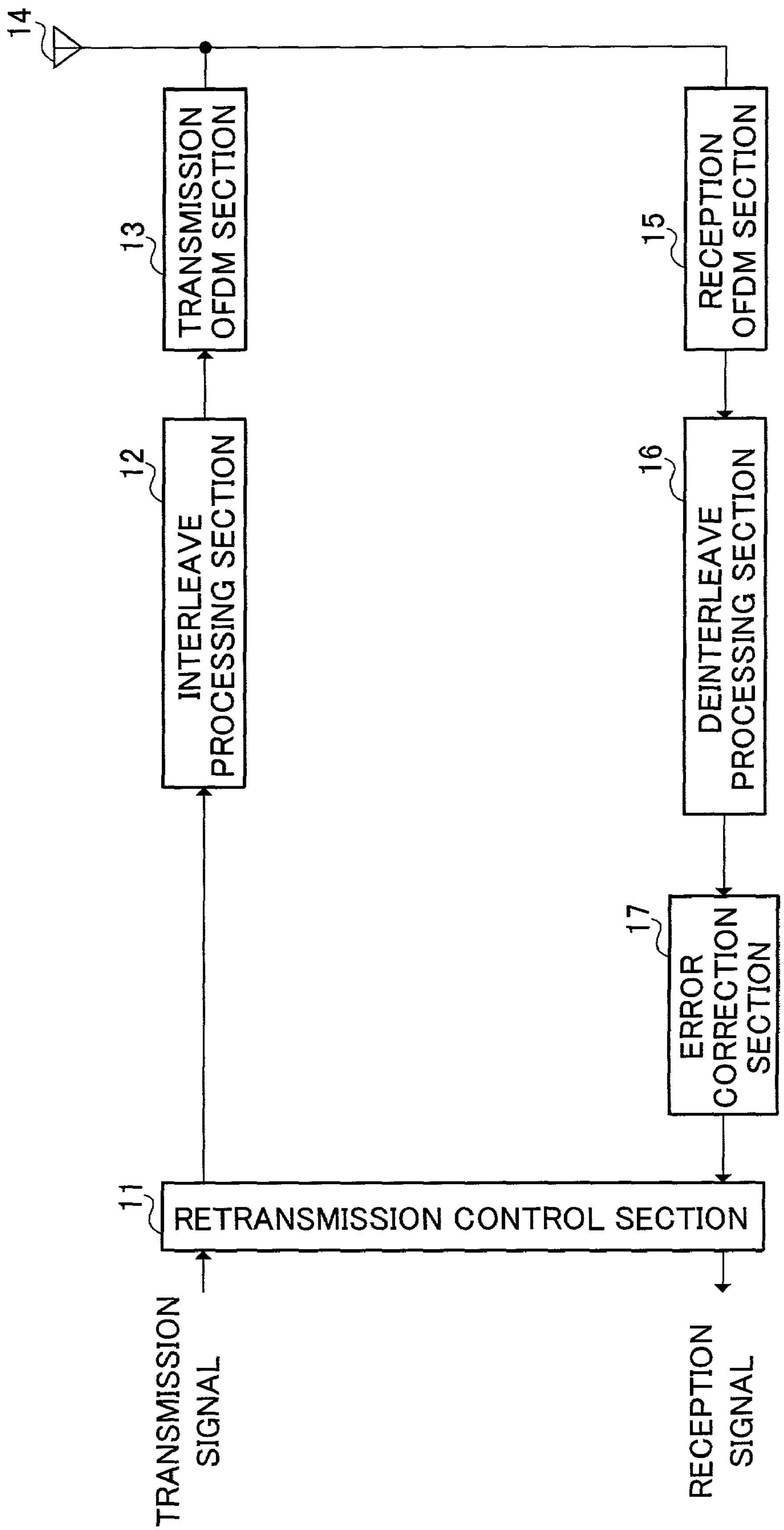
FIG. 1 is a block diagram showing a configuration of a conventional OFDM communication apparatus using an interleave technology.
Figure 2:
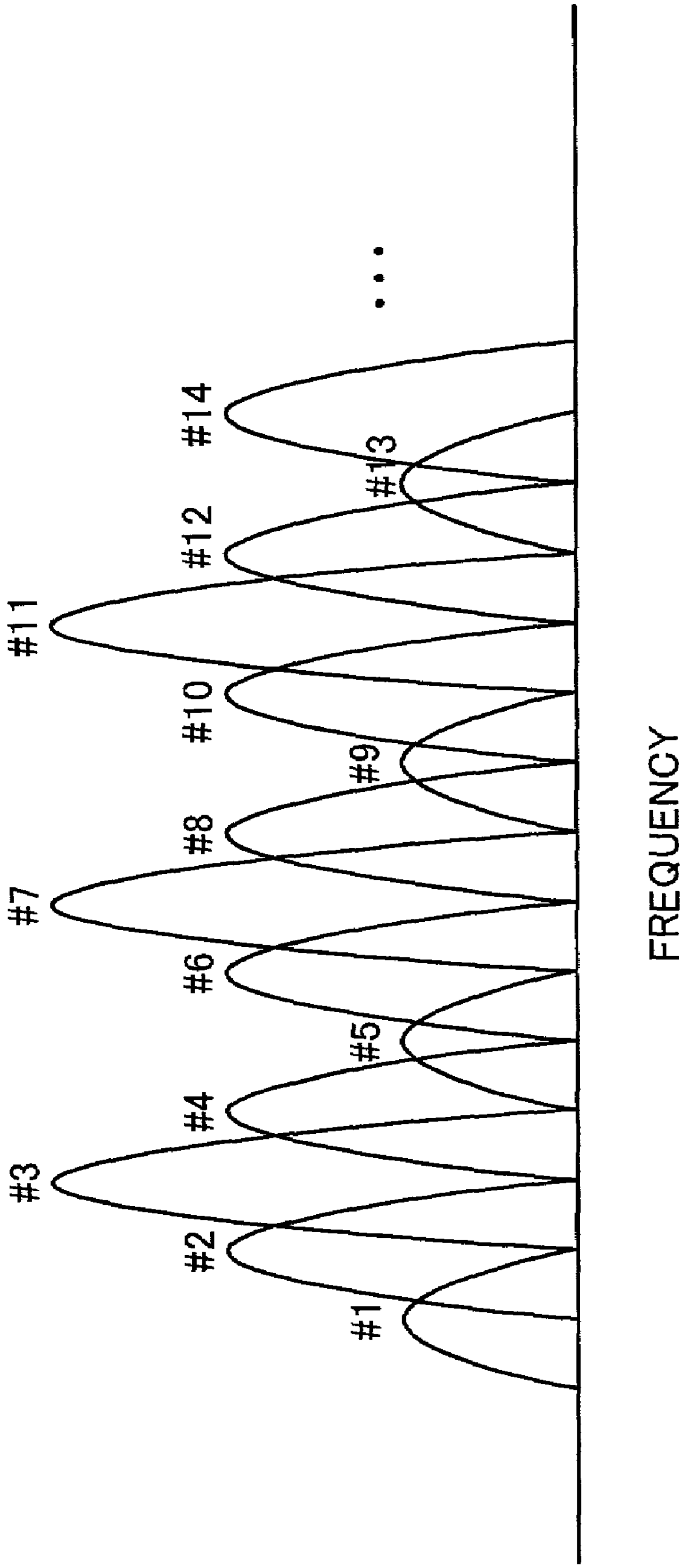
FIG. 2 is a schematic diagram showing an example of subcarrier placement in signals received by an OFDM apparatus using an interleave technology.
Figure 3:
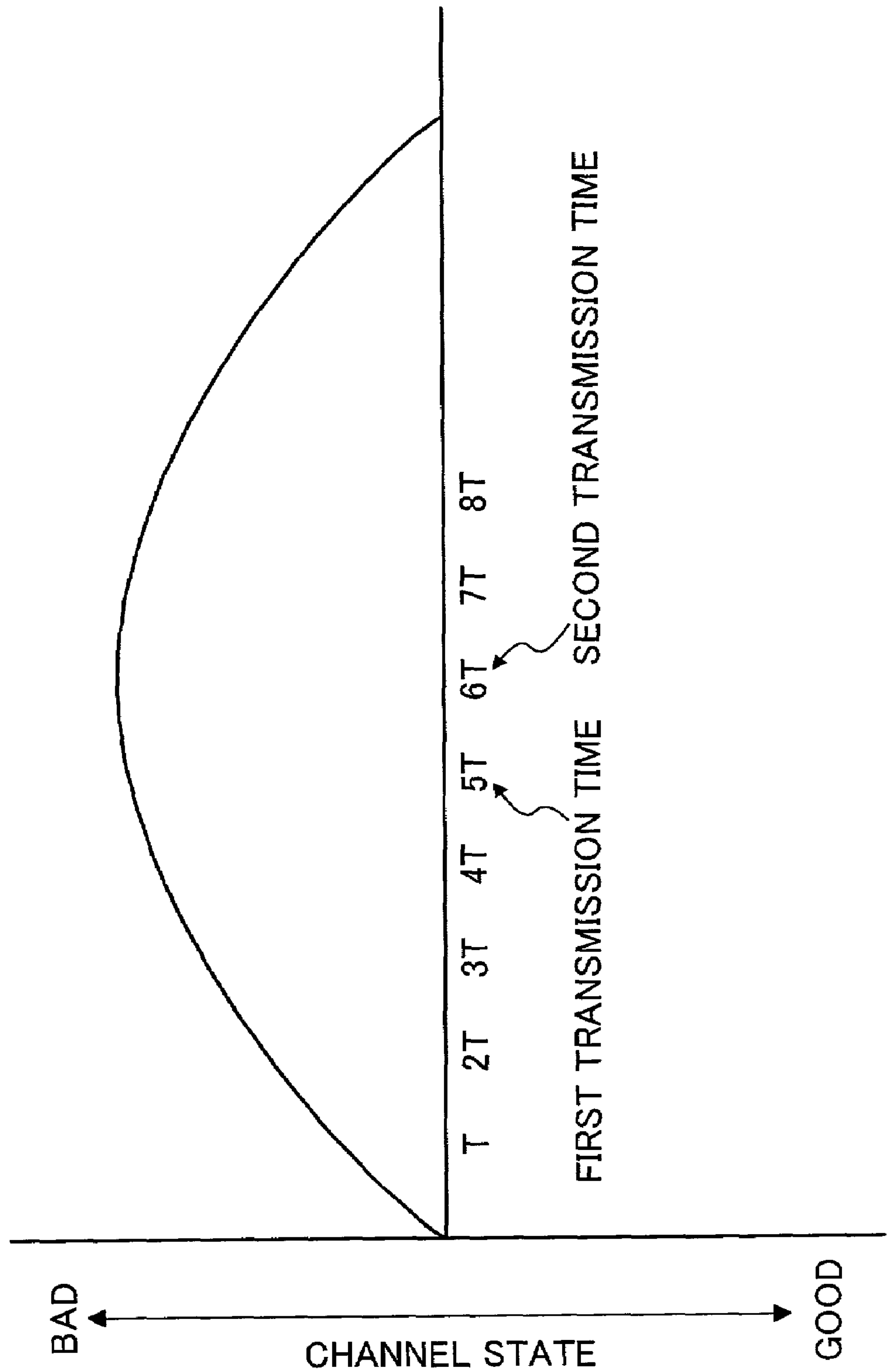
FIG. 3 is a schematic diagram showing a state of a channel used by the conventional OFDM communication apparatus using an interleave technology.

As shown in FIG. 2, when a specific packet is received by the second communication apparatus for the first time, the signal output from reception OFDM section 107 is the signal picked up by each subcarrier in time series at intervals of 4 subcarriers such as subcarrier 1, subcarrier 5, subcarrier 9 and subcarrier 13, . . . . As is apparent from FIG. 2, since the signals assigned to subcarrier 1, subcarrier 5, subcarrier 9 and subcarrier 13, . . . have poor signal quality, the signals picked up in this way contain errors concentrated on a specific time period.

On the other hand, when the above specific packet is received by the second communication apparatus again, the signal output from reception OFDM section 107 is the signal picked up by each subcarrier in time series at intervals of 2 subcarriers such as subcarrier 1, subcarrier 3, subcarrier 5 and subcarrier 7, . . . . Suppose, however, the channel state when the above specific packet is received by the second communication apparatus for the first time is virtually the same as the channel state when the above specific packet is received again.

As is apparent from FIG. 2, the signals picked up in this way include signals of poor quality and signals of good quality inserted alternately, and therefore these are signals with a low probability that errors will be concentrated on a specific time period. That is, since signals in a specific packet of the first communication apparatus are transmitted after being assigned to subcarriers which differ when this specific packet is transmitted for the first time and when the packet is retransmitted, the quality of each signal in the above specific packet received by the second communication apparatus differs from one case to another. Here, since the channel states in the above cases are virtually the same, the probability that errors will be concentrated on a specific time period is low in the above specific packet received by the second communication apparatus.

Therefore, when there is almost no change in the channel state between the first transmission and retransmission of the specific packet by the first communication apparatus, the probability that errors will occur in the packet retransmitted to the second communication apparatus by the first communication apparatus is extremely low. That is, in the above case, it is possible to avoid cases where errors will occur consecutively in a specific packet.

This embodiment describes the case where two interleave processing sections and two deinterleave processing sections are provided, but the present invention is not limited to this and is also applicable to a case where more interleave processing sections and more deinterleave processing sections are provided. In this case, it is possible to use a plurality of interleave processing sections and deinterleave processing sections provided according to the number of retransmissions of the packet to be sent. This can reduce, with increased certainty, the probability that errors will occur consecutively in the same packet.

Furthermore, this embodiment describes the case where the first communication apparatus sends a signal to the second communication apparatus and when an error is found in the signal received by the second communication apparatus, this signal with the error is retransmitted (resent) from the first communication apparatus to the second communication apparatus. However, since both the first communication apparatus and the second communication apparatus have the configuration shown in FIG. 4, the present invention is also applicable to a case where the second communication apparatus sends a signal to the first communication apparatus and when an error is found in the signal received by the first communication apparatus, this signal with the error is retransmitted (resent) from the second communication apparatus to the first communication apparatus.

As shown above, this embodiment provides a plurality of interleave processing sections that perform mutually different interleave and a plurality of deinterleave processing sections that perform mutually different deinterleave and uses the above plurality of interleave processing sections and deinterleave processing sections, that is changes the interleave method according to the number of retransmissions of a packet to be sent, thus making it possible to reduce the probability that errors will occur consecutively in the same packet. When an error occurs in a specific packet, this will shorten the time required until this specific packet is received without errors.

This embodiment describes the case where interleave processing is changed according to the number of retransmissions of a certain packet, but the present invention is not limited to this and is also applicable to a case where a plurality of interleave processing sections and deinterleave processing sections are used differently according to various conditions such as channel quality. This makes it possible to reduce the probability that errors will occur in the received packet.

The OFDM communication apparatus according to the embodiment of the present invention can be mounted on a communication terminal apparatus and base station apparatus in a digital mobile communication system.

As described above, the present invention applies interleave processing to a transmission signal according to the number of retransmissions of the transmission signal, making it possible to provide an OFDM communication apparatus capable of reducing the probability that errors will occur consecutively in a same packet.

This application is based on the Japanese Patent Application No.HEI 11-233909 filed on Aug. 20, 1999, entire content of which is expressly incorporated by reference herein.

INDUSTRIAL APPLICABILITY

The present invention is ideally applicable to the field of an OFDM-based communication apparatus that carries out retransmission control.

What is claimed is:

1. An OFDM transmission apparatus comprising:

an interleaver that interleaves a plurality of signals according to a first rule in a case of transmitting the plurality of signals, and interleaves the plurality of signals according to a second rule in a case of retransmitting the plurality of signals, the second rule being different from the first rule;

an assigner that assigns the interleaved signals to a plurality of subcarriers to generate an OFDM signal; and a transmitter that transmits or retransmits the OFDM signal.

2. The OFDM transmission apparatus according to claim 1, in which the plurality of signals include a first signal, wherein said interleaver interleaves the plurality of signals according to the first rule to allow said assigner to assign the first signal to a first subcarrier of the plurality of subcarriers, and interleaves the plurality of signals according to the second rule to allow said assigner to assign the first signal to a second subcarrier of the plurality of subcarriers, the second subcarrier being different from the first subcarrier.

3. The OFDM transmission apparatus according to claim 1, in which the plurality of signals include a first signal and a second signal, wherein said interleaver interleaves the plurality of signals according to the first rule to allow said assigner to assign the first signal and the second signal to a first set of subcarriers of the plurality of subcarriers, the first set of subcarriers having a first interval, and interleaves the plurality of signals according to the second rule to allow said assigner to assign the first signal and the second signal to a second set of subcarriers of the plurality of subcarriers, the second set of subcarriers having a second interval, the second interval being different from the first interval.

4. The OFDM transmission apparatus according to claim 3, wherein the second interval is narrower than the first interval.

5. A communication terminal apparatus comprising the OFDM transmission apparatus according to claim 1.

6. A base station apparatus comprising the OFDM transmission apparatus according to claim 1.

7. An OFDM reception apparatus comprising:

a receiver that receives an OFDM signal which is transmitted or retransmitted;

a pickup section that picks up, from the OFDM signal, a plurality of signals assigned to a plurality of subcarriers;

a deinterleaver that deinterleaves the picked-up signals according to a first rule in a case of receiving the transmitted signals, and deinterleaves the pick-up signals according to a second rule in a case of receiving the retransmitted signals, the second rule being different from the first rule; and an error corrector that performs an error correction on the deinterleaved signal.

8. The OFDM reception apparatus according to claim 7, wherein said pickup section picks up a first signal of the plurality of signals, the first signal being assigned to a first subcarrier of the plurality of subcarriers in the case of receiving the transmitted OFDM signal, and the first signal being assigned to a second subcarrier of the plurality of subcarriers in the case of receiving the retransmitted OFDM signal, the second subcarrier being different from the first subcarrier.

9. The OFDM reception apparatus according to claim 7, wherein said pickup section picks up a first signal and a second signal of the plurality of signals, both of the first signal and the second signal being assigned to a first set of subcarriers of the plurality of subcarriers in the case of receiving the transmitted OFDM signal, the first set of subcarriers having a first interval, and both of the first signal and the second signal being assigned to a second set of subcarriers of the plurality of subcarriers in the case of receiving the retransmitted OFDM signal, the second set of subcarriers having a second interval, the second interval being different from the first interval.

10. The OFDM reception apparatus according to claim 9, wherein the second interval is narrower than the first interval.

11. A communication terminal apparatus comprising the OFDM reception apparatus according to claim 7.

12. A base station apparatus comprising the OFDM reception apparatus according to claim 7.

* * * * *